US005826670A

United States Patent [19]

Nan

[11] Patent Number: 5,826,670

[45] Date of Patent: Oct. 27, 1998

[54] DETACHABLE PROPULSIVE DEVICE FOR WHEELCHAIR

[76] Inventor: Huang Shun Nan, No. 32, Nei-Hsi Chou, Nei-Hsi Tsun, Shui-Shang Village, Chia-I Hsien, Taiwan

[21] Appl. No.: 698,181

[22] Filed: Aug. 15, 1996

[51] Int. Cl.$^{6}$ .................................................... B60K 1/00

[52] U.S. Cl. ................................ 180/15; 180/12; 180/16; 180/211; 180/907

[58] Field of Search ................................ 180/11, 12, 13, 180/15, 16, 211, 213, 214, 907; 280/250.1, 304.1

[56] References Cited

U.S. PATENT DOCUMENTS

| | | | |
|---|---|---|---|
| 2,495,573 | 1/1950 | Duke | 180/11 |
| 2,978,053 | 4/1961 | Schmidt | 180/16 |
| 3,336,042 | 8/1967 | Southhall | 180/12 |
| 3,349,862 | 10/1967 | Shirey | 180/15 |
| 3,912,032 | 10/1975 | Benz et al. | 180/13 |
| 3,945,449 | 3/1976 | Ostrow | 180/907 |
| 5,016,720 | 5/1991 | Coker | 180/907 |
| 5,050,695 | 9/1991 | Kleinwolterink | 180/13 |
| 5,135,063 | 8/1992 | Kropf | 180/13 |
| 5,494,126 | 2/1996 | Meeker | 180/13 |

*Primary Examiner*—Daniel G. DePumpo
*Attorney, Agent, or Firm*—Rosenberg Klein & Bilker

[57] ABSTRACT

A detachable propulsive device for a wheelchair includes a longitudinal skeleton frame, a driving unit attached to the front of the skeleton frame, a handle for steering the propulsive device, dimensions adjusting unit, and auxiliary wheels. The dimensions adjusting unit carries four retaining clips and allows to adjust distances between these clips lengthwise and widthwise, so that the clips are capable of engaging and holding side members of the bottom frame of the wheelchair of any desired length and width. The length adjusting mechanism of the dimensions adjusting unit includes a system of telescopically movable hollow tubes with U-shaped cross sliding rails secured to them, while the width adjusting mechanism includes sliding arms carrying the retaining clips on their outer ends and sliding longitudinally along the U-shaped cross sliding rails in the lateral direction. The auxiliary wheels at the rear of the propulsive device are lifted from the ground once the device has been attached to the wheelchair.

6 Claims, 7 Drawing Sheets

DETACHABLE PROPULSIVE DEVICE FOR WHEELCHAIR

BACKGROUND OF THE INVENTION (1) Field of the Invention

The present invention relates to a propulsive device for a wheelchair, and more particularly, to a device which can be mounted on and dismounted from an electric wheelchair as needed.

(2) Description of Prior Art

It is convenient for riders of electric wheelchairs, especially for the ages and weak people, to operate the wheelchair themselves without a helper. But there are some shortcomings which may disturb the user.

1. Most of the conventional electric wheelchairs are driven by a motor and a transmission, and powered by a battery. These parts make the wheelchair complicated and increase production cost.

2. Because the battery is the only power source in the electric wheelchair, when the battery is low or dead, the transmission gears in the drive unit will seize up each other to disable the wheels to roll, therefore the electric wheelchair cannot roll.

3. Most of the parts, such as motor, battery and the transmission unit are fixed on the cart frame, thereby making the electric wheelchair too heavy to carry by hand.

OBJECTS AND SUMMARY OF THE INVENTION

In order to overcome the shortcomings of the prior art, a main object of the present invention is to provide a detachable propulsive device for a wheelchair which is designed with the major mechanical parts thereof detachably mounted on the wheelchair by any person, without requiring a special technical skill.

According to the teaching of the present invention, a propulsive device is attached to side members of the bottom frame of a wheelchair by four clips. It is essential that distance between each two clips is adjustable according to the dimensions of the wheelchair.

The propulsive device includes a skeleton frame carrying, at the front end thereof, driving and steering means. For adjusting the distance between the clips, the propulsive device includes a dimensions adjusting unit which includes a length adjusting mechanism, and a width adjusting mechanism. Preferably, the length adjusting mechanism includes a pair of telescopically moving hollow tubes (front and rear), telescopically arranged at the rear end of the skeleton frame. The front hollow tube has an axial slot extending along the length thereof. A threaded hole is located at the rear end of the skeleton frame, and another threaded hole is located at the front end of the rear hollow tube. When the rear end of the skeleton frame and the front end of the rear hollow tube are inserted into the front hollow tube, they can be secured in a required mutual disposition thereof by fasteners protruding through the respective threaded holes on the skeleton frame and the rear hollow tube and the axial slot on the front hollow tube, according to the required length of the wheelchair.

Each of the hollow tubes carries a U-shaped cross sliding rail, distance between which is adjusted by telescopic movement of the hollow tube with respect to each other.

In order to adjust the width of the propulsive device, the width adjustment mechanism is employed. It includes two slide arms for each U-shaped cross sliding rail. The sliding arms are capable of sliding longitudinally within the sliding rail and of being secured at a required relative disposition therebetween.

Each sliding arm carries a clip at an outer end thereof. The clip includes a retaining V-shaped clip and a floating clip in swinging arrangement therebetween.

BRIEF DESCRIPTION OF THE DRAWINGS

FIG. 3-A is a top view of FIG. 3;

DETAILED DESCRIPTION OF PREFERRED EMBODIMENTS

Figure 1:
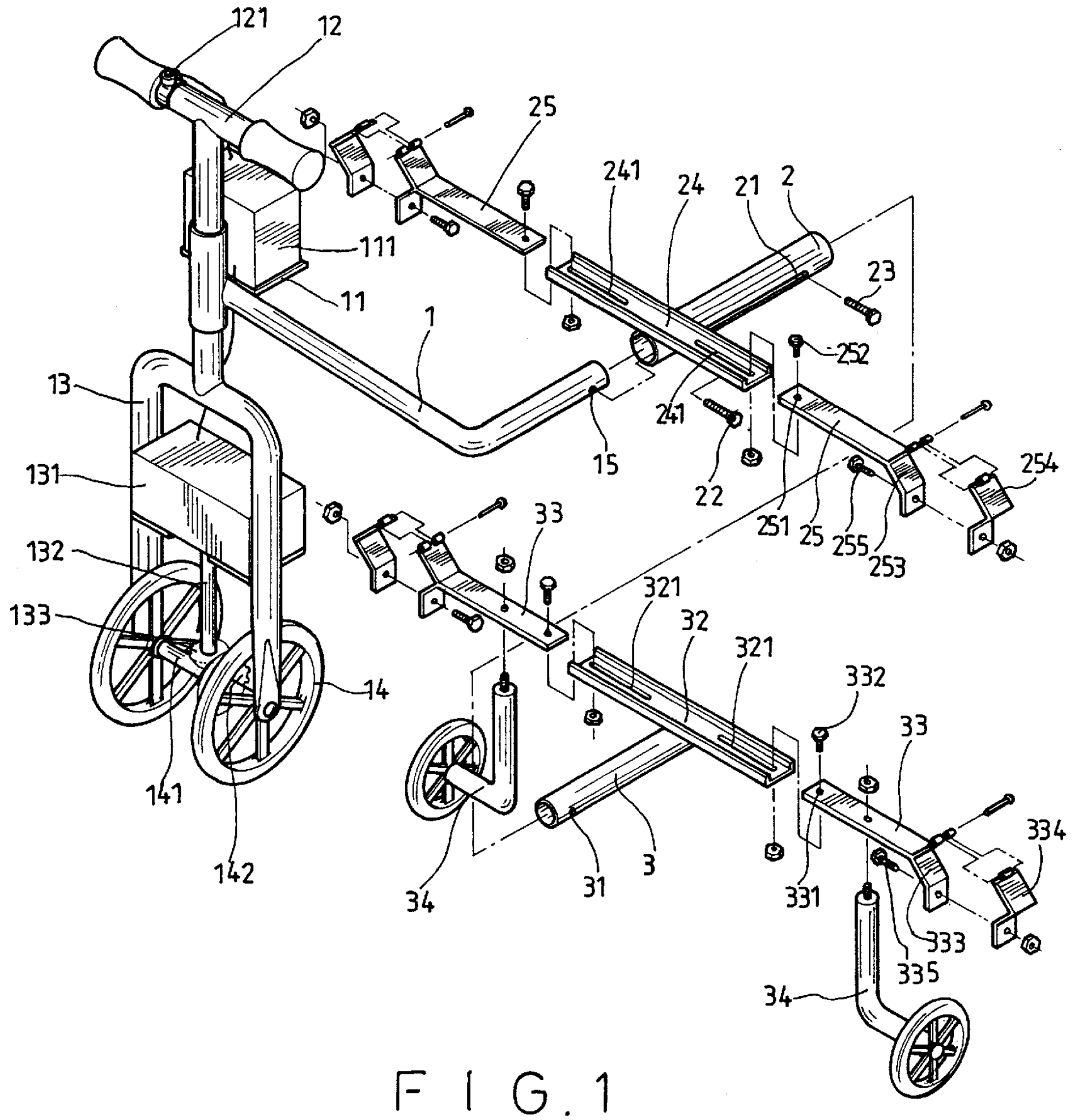
FIG. 1 is an exploded view of the propulsive device of the present invention.

Referring to FIG. 1, the present invention includes a longitudinal skeleton frame 1, a pair of axial telescopic tubes 2 and 3 also referred to as front and rear tubes.

Mounted at the front end of the skeleton frame 1, is a battery container 11 for holding a battery therein, a T-shaped handle 12 having a pilot switch 121, a fork-like front wheel mount 13 extending downwardly from the handle 12, a motor 131 secured at the center portion of the wheel mount 13, and a transmission shaft 132 extending downwardly from said motor 131 and having a bevel gear 133 secured to the lower extreme end thereof. Two wheels 14 are mounted on the bottom end of the skeleton frame 1 and linked by a wheel axle 141 which is engaged with the bevel gear 133. A threaded hole 15 is formed on the rear end of the skeleton frame 1.

The front telescopic tube 2 is a hollow tube arranged to allow the skeleton frame 1 and the rear telescopic tube 3 to slide therein. The front tube 2 has an axial slot 21 on one side thereof, so that two bolts can pass through the slot 21 and threaded holes 15 and 31 to secure the skeleton frame 1 and the rear telescopic tube 3 in a required mutual disposition thereof. U-shaped cross sliding rail 24 is secured to the top portion of the front tube 2. The rail 24 has two slots 241 at respective ends thereof for linking sliding arms 25 respectively and securing them in a required disposition by a bolt 252 passing through a hole 251 to fasten the sliding arm 25 on one end of the sliding arm 25. The other end of the sliding arm 25 has a V-shaped retaining clip 253 and a floating clip 254 swingingly attached to the retaining clip 253 by a bolt 255.

The rear telescopic tube 3 is adapted to slide within the front telescopic tube 2 and comprises a threaded hole 31 at the front end thereof. U-shaped cross sliding rail 32 at the other end has two slots 321 at respective ends thereof. Two sliding arms 33 are slidably fastened to the slots 321, respectively. Each sliding arm 33 has a through hole 331 at inner end thereof and a V-shaped retaining clip 333 at the other end. A floating clip 334 is swingingly fastened to the retaining clip 333 by fasteners 335.

Two auxiliary wheels 34 are secured to the bottom end of each sliding arm 33.

Figure 2:
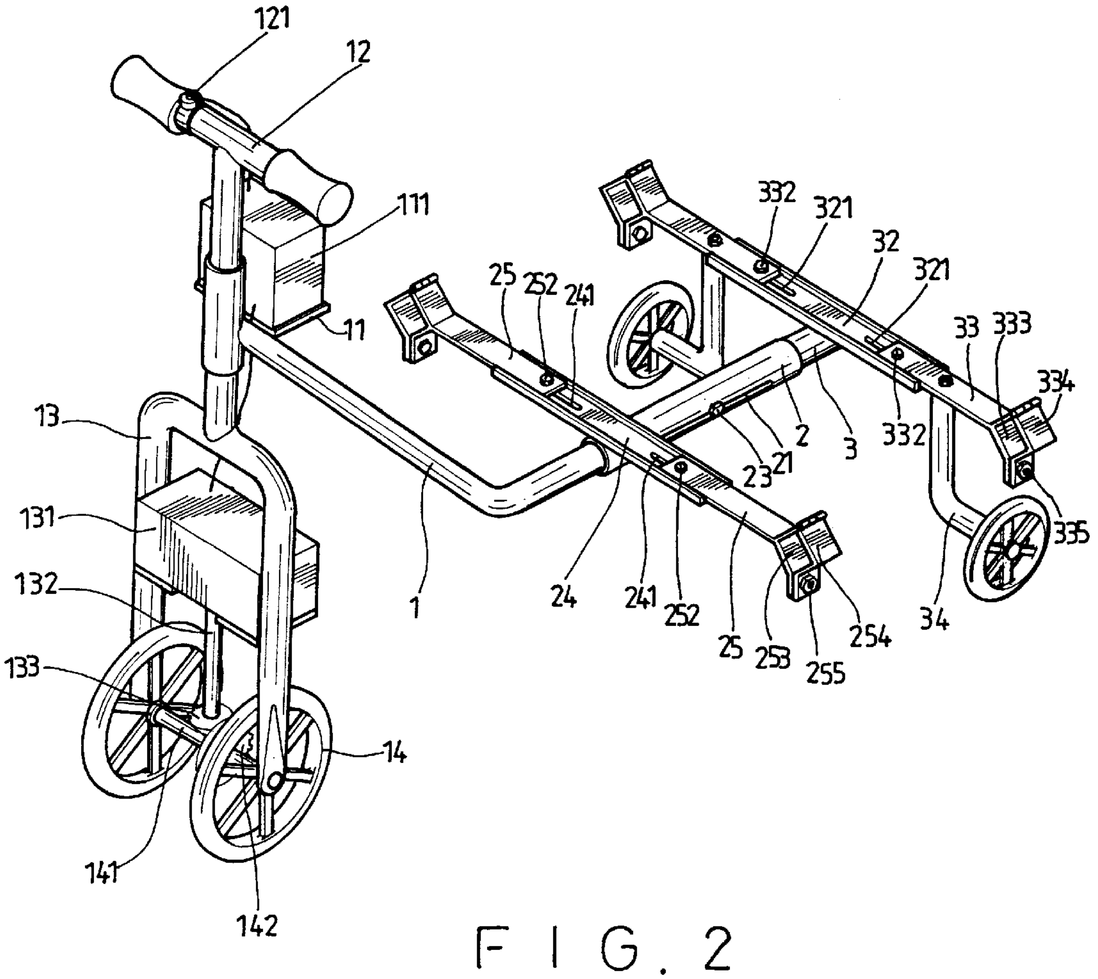
FIG. 2 is a perspective view of the propulsive device of the present invention.

To assemble the propulsive device, as shown in FIG. 2, the telescopic tube 2 is put on the rear end of the skeleton frame 1, the bolts 22 are inserted through the slots 21 and secured to the threaded hole 15. Then, the telescopic tube 3 is inserted into the telescopic tube 2 from the rear end thereof and the bolt 23 is secured to the threaded hole 31 through the slot 21. Further, the sliding arms 25 and 33 are attached to the sliding rails 24 and 32 of the tubes 2 and 3, and the bolts 252 and 332 are inserted through holes 251, 331 and slots 241 and 321 and fastened thereat.

Figure 3:
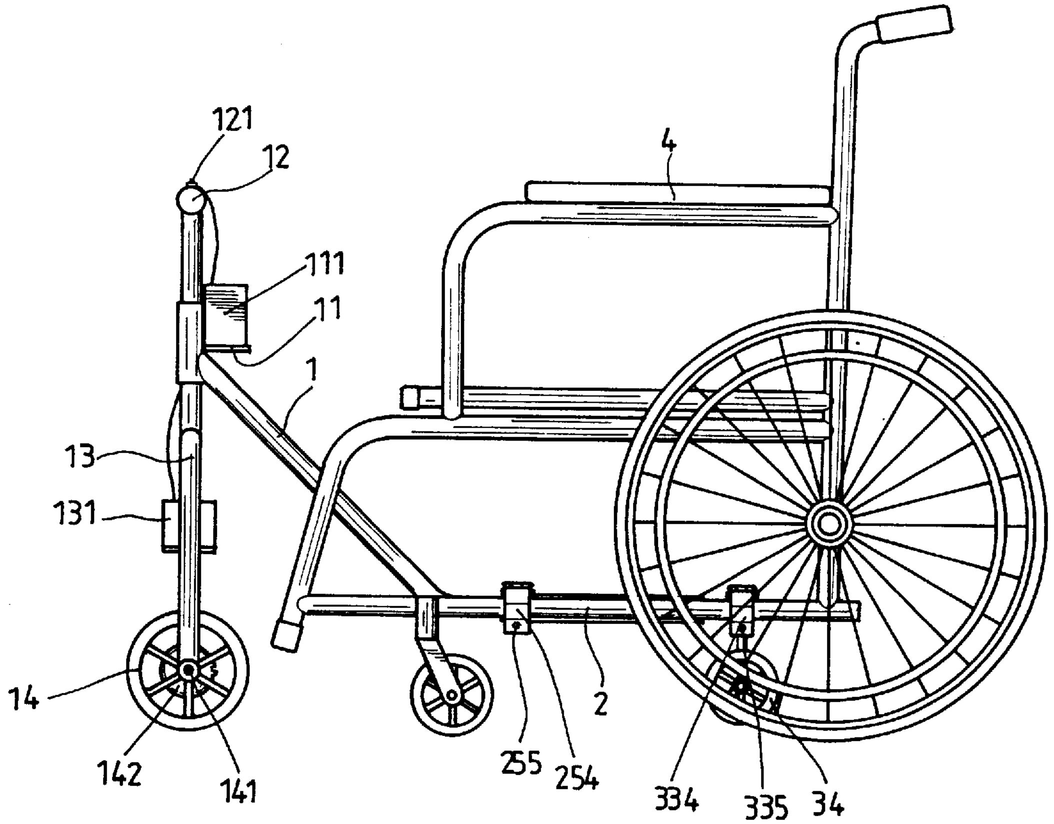
FIG. 3 is a side view showing the propulsive device of the present invention attached to the wheelchair.
Figure 3A:
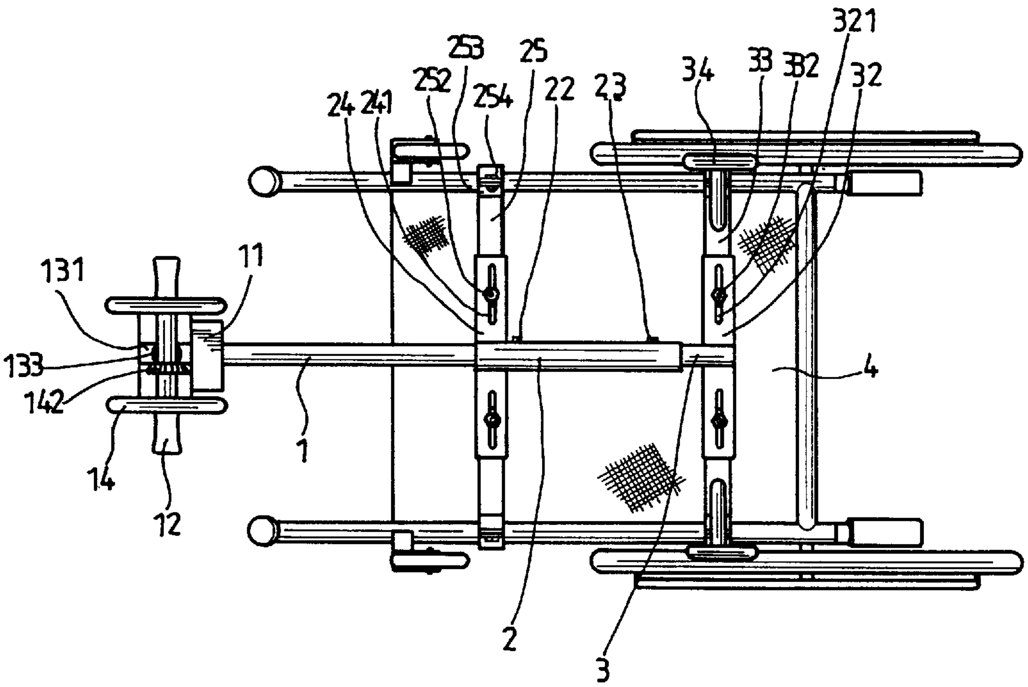

In use, referring to FIG. 3 and FIG. 3-A, the integrated propulsion device is fastened to the underside of a regular wheelchair the following way. By adjusting the front and the rear telescopic tubes 2 and 3 in the longitudinal direction and the sliding arms 25 and 33 in the lateral direction, the clips 254, 255, 333 and 334 at the outer ends of the sliding arms 25 and 33 are able to engage and hold the steel frame on the respective bottom sides of the wheelchair 4. Once the clips 254, 255, 333 and 334 have been secured to the wheelchair 4, the auxiliary wheels 34 will be lifted up from ground, so that the handle 12, the wheel mount 13 and the wheels 14 on the skeleton frame 1 become the forward most support to the wheelchair 4. Rider may control the wheelchair 4 easily by grasping the handle 12 and pressing the pilot switch 121.

Figure 4:
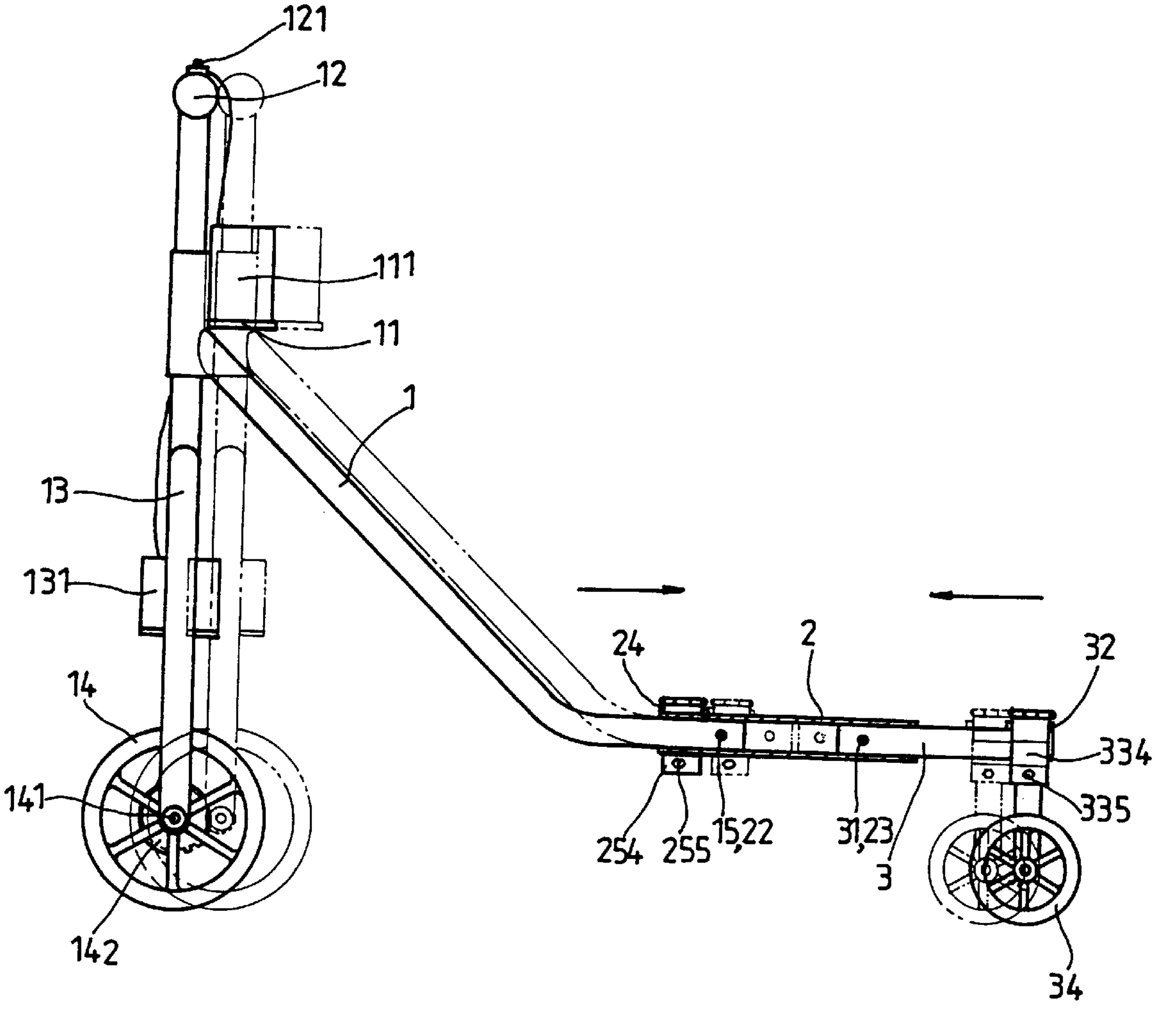
FIG. 4 is a side view showing the longitudinal adjusting of the propulsive device of the present invention.
Figure 5:
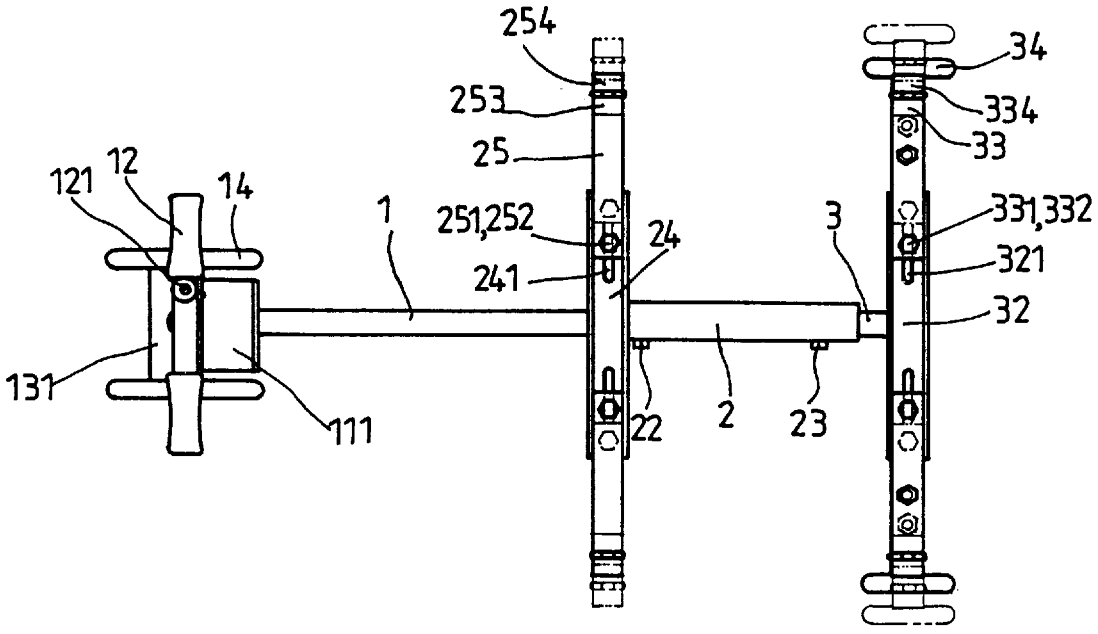
FIG. 5 is a top view showing the cross adjusting of the propulsive device of the present invention.
Figure 6:
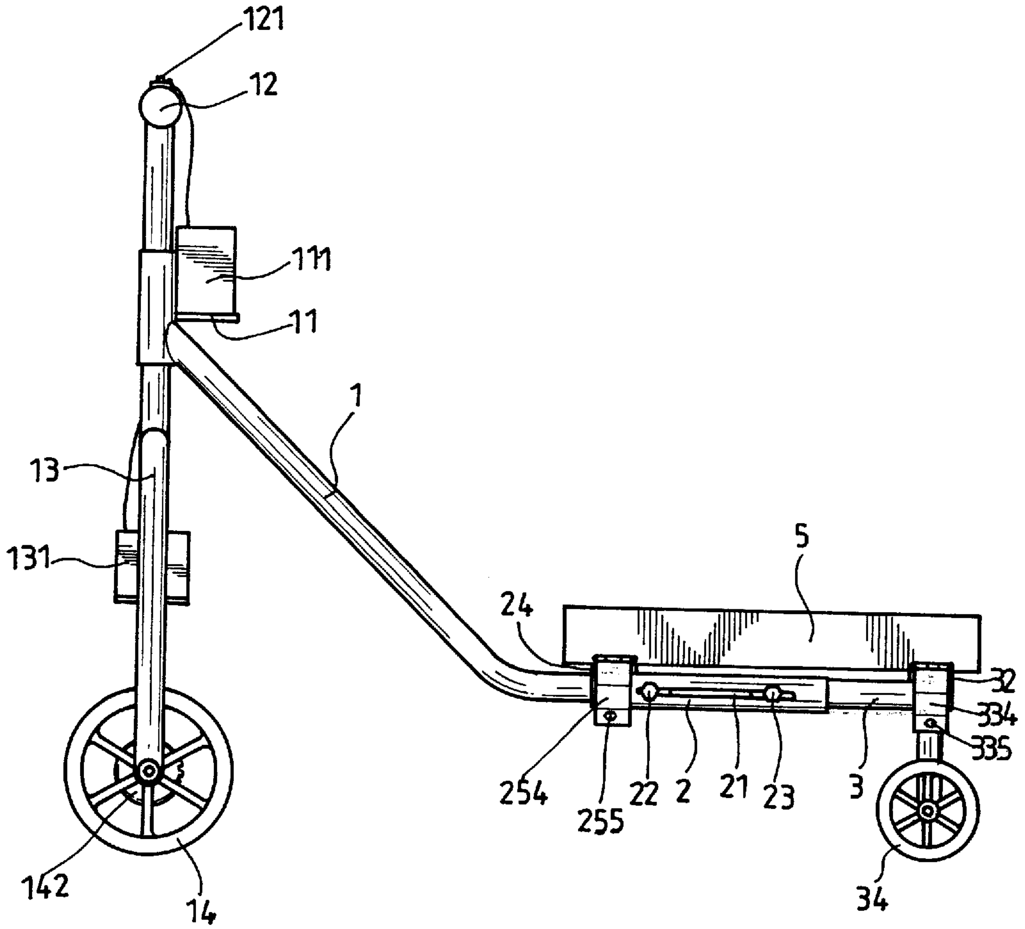
FIG. 6 is a side view showing an operation of the propulsive device of the present invention.

Owing to the adjustable character of the front and the rear telescopic tubes 2 and 3 and the sliding arms 25 and 33, the present invention is suitable to wheelchairs of various sizes currently in the market. For instance, by adjusting the front and the rear telescopic tubes 2 and 3, the longitudinal distance is adjustable, as shown in FIG. 4, or by adjusting the sliding arms 25 and 33 along the sliding rails 24 and 32, the width of the propulsive device is adjustable, as shown in FIG. 5. In addition, when dismounted from the wheelchair 4, the propulsive device functions as a carrying cart to carry goods, as shown in FIG. 6.

I claim:

1. A detachable propulsive device for a wheelchair having a bottom frame, including first and second substantially parallel spaced apart side members thereof, said propulsive device, comprising:

a skeleton frame having a front end and a rear end drive means mounted at said front end of said skeleton frame, said drive means including a motor, a power source powering said motor, and a set of front wheels driven by said motor, steering means mounted at said front end of said skeleton frame for directionally controlling said set of front wheels, said steering means comprising a handle, and a rotatable wheel mount extending downward from said handle and supporting said set of front wheels thereon, dimensional adjusting unit mounted at said rear end of said skeleton frame, said dimensional adjusting unit comprising a length adjusting mechanism; and, a width adjusting mechanism, and first and second pairs of clips coupled to said dimensional adjusting unit;

said length adjusting mechanism including:

(a) first and second telescopic sliding hollow tubes, (b) first fastening means securing said first and second tubes in telescopic interrelationship, said first hollow tube being installed at said rear end of said skeleton frame, and (c) a pair of U-shaped cross sliding rails, each of said cross sliding rails being secured to a respective one of said first and second telescopic sliding hollow tubes substantially perpendicularly thereto;

said width adjusting mechanism including:

(a) a pair of sliding arms coupled to each of said U-shaped cross sliding rails, each said sliding arms engaging a respective one of said U-shaped cross sliding rail at opposing ends thereof, each of said sliding arms having an inner end slidingly engaged within a respective one of said U-shaped cross sliding rails and an outer end thereof, and (b) second fastening means securing each said pair of sliding arms in a selected position with respect to a respective one of said U-shaped cross sliding rails, said outer end of each of said sliding arms carrying a respective one of said first and second pairs of clips, one of said pairs of clips being a V-shaped retaining clip and the other of said pairs of clips being a floating clip attached to said V-shaped retaining clip in a swinging arrangement therewith;

said first and second pairs of said clips engaging the first and second side members of the bottom frame of the wheelchair and holding the side members enveloped between said V-shaped retaining clip and said floating clip to thereby attach said propulsive device to said wheelchair.

2. The detachable propulsive device of claim 1, further including a pair of auxiliary wheels, each of said pair of auxiliary wheels being releasably secured to a respective one of the pair of sliding arms engaging said U-shaped cross sliding rail attached to said second hollow tube.

3. The detachable propulsive of claim 1, wherein said rear end of said skeleton frame telescopically slides within said first hollow tube, and wherein said second hollow tube telescopically slides within said first hollow tube;

an axial slot extends longitudinally along said first hollow tube, a first threaded hole is positioned at the rear end of said skeleton frame, and a second threaded hole is positioned at a front end of said second hollow tube;

a first threaded fastener protrudes through said axial slot at a front end thereof and said first threaded hole at said rear end of said skeleton frame, and a second threaded fastener protrudes through said axial slot at a rear end thereof and said second threaded hole at said front end of said second hollow tube, thereby securing said skeleton frame, and said first and second hollow tubes in their selected position to thereby adjust the length of the detachable propulsive device.

4. The detachable propulsive device of claim 1, wherein each of said U-shaped cross sliding rails is formed with a pair of longitudinal slots, each slot disposed at a respective end of said U-shaped cross sliding rail, said inner end of each of said sliding arms having a threaded hole formed therein, and said sliding arms being selectively secured to a respective U-shaped cross sliding rail by threaded fasteners, each threaded fastener protruding through a respective threaded hole at said inner end of a respective one of said sliding arms and through a respective slot of said U-shaped cross sliding rail, thereby providing a width adjustment of said detachable propulsive device.

5. The detachable propulsive device of claim 1, wherein said V-shaped retaining clip and said floating clip are provided with apertures, and a threaded fastener protrudes through said apertures on said retaining clip and said floating clip to thereby secure them to each other in a swinging arrangement.

6. The detachable propulsive device of claim 1, wherein said set of front wheels includes a pair of front wheels linked by a wheel axle, said rotatable wheel mount including a rotatable fork-like wheel mount supporting said wheel axle at a bottom end thereof, and a rotatable column extending between said handle and said fork-like wheel mount, said power source being secured to said rotatable column and said motor being secured to said fork-like wheel mount, a transmission shaft extending from said motor to said wheel axle, and a bevel gear transmission link disposed between said transmission shaft and said wheel axle.

* * * * *